United States Patent
Johnson et al.

(10) Patent No.: US 9,483,039 B2
(45) Date of Patent: Nov. 1, 2016

(54) WIRELESS FIELD DEVICE HAVING DISCRETE INPUT/OUTPUT

(75) Inventors: James Johnson, Savage, MN (US); Richard Nelson, Chanhassen, MN (US); Robert Michael Weinberger, Prior Lake, MN (US)

(73) Assignee: Rosemount Inc., Eden Prairie, MN (US)

( * ) Notice: Subject to any disclaimer, the term of this patent is extended or adjusted under 35 U.S.C. 154(b) by 518 days.

(21) Appl. No.: 13/450,955

(22) Filed: Apr. 19, 2012

(65) Prior Publication Data

US 2013/0278395 A1 Oct. 24, 2013

(51) Int. Cl.
*G05B 11/01* (2006.01)
*G05B 19/042* (2006.01)
(Continued)

(52) U.S. Cl.
CPC ......... *G05B 19/0423* (2013.01); *G05B 19/048* (2013.01); *G05B 19/054* (2013.01)

(58) Field of Classification Search
CPC ..... H04W 4/006; G08B 17/00; G08B 29/00; G05B 19/0423; G05B 19/048; G05B 19/054
USPC .............................. 340/539.3, 638, 945, 459
See application file for complete search history.

(56) References Cited

U.S. PATENT DOCUMENTS

| | | | |
|---|---|---|---|
| 2,951,980 A | * | 9/1960 | Johnes ................. H03G 1/0052 327/330 |
| 4,088,974 A | * | 5/1978 | Zhitetsky ............. G01N 33/203 374/26 |

(Continued)

FOREIGN PATENT DOCUMENTS

| | | |
|---|---|---|
| CN | 1442822 | 9/2003 |
| CN | 101576059 | 11/2009 |

(Continued)

OTHER PUBLICATIONS

Invitation to Pay Additional Fees, and Where Applicable, Protest Fee dated Jul. 16, 2013 for International Appln. No. PCT/US2013/029491, filed Mar. 7, 2013.

(Continued)

*Primary Examiner* — Jennifer Mehmood
*Assistant Examiner* — Rufus Point
(74) *Attorney, Agent, or Firm* — Westman, Champlin & Koehler, P.A.

(57) ABSTRACT

A wireless field device for use in an industrial process includes input/output terminals configured to couple to a process interface element. A discrete input/output channel is configured to receive a discrete input from the process interface element through the input/output terminals when configured as a discrete input channel. The discrete input/output channel is further configured to provide a discrete output to the process interface element through the input/output terminals when the discrete input/output channel is configured as discrete output channel. Wireless communication circuitry is configured to transmit and receive information. A controller communicates information through the wireless communication circuitry and operates in accordance with configuration information to configure the input/output channel as an input channel when the input/output terminals are connected to a discrete process variable sensor, and further configure the discrete input/output channel as a discrete output channel when the input/output terminals are coupled to a discrete control element.

28 Claims, 5 Drawing Sheets

(51) Int. Cl.
  *G05B 19/048* (2006.01)
  *G05B 19/05* (2006.01)

(56) References Cited

U.S. PATENT DOCUMENTS

| | | | | | |
|---|---|---|---|---|---|
| 4,183,241 | A | * | 1/1980 | Fainzilberg | H03M 1/1019 374/26 |
| 4,198,679 | A | * | 4/1980 | Fainzilberg | G01N 25/04 374/26 |
| 4,677,308 | A | * | 6/1987 | Wroblewski | B60R 16/027 307/10.1 |
| 4,691,235 | A | * | 9/1987 | Okui | H04N 5/185 348/697 |
| 4,764,868 | A | * | 8/1988 | Ketelhut | G05B 19/054 710/12 |
| 4,897,662 | A | * | 1/1990 | Lee | H01Q 1/24 327/205 |
| 5,731,595 | A | | 3/1998 | Clark | |
| 6,795,767 | B2 | | 9/2004 | Nakamoto et al. | |
| 7,023,352 | B2 | * | 4/2006 | Tseng | G01R 19/16547 320/136 |
| 7,154,723 | B1 | * | 12/2006 | Warnakulasooriya | G06F 1/206 361/103 |
| 7,336,068 | B2 | | 2/2008 | Muller | |
| 7,447,612 | B2 | | 11/2008 | Keyes, IV et al. | |
| 7,636,615 | B2 | * | 12/2009 | Pfingsten | H01R 9/2425 307/113 |
| 8,085,143 | B2 | * | 12/2011 | Hollander | H04B 1/034 340/514 |
| 8,149,102 | B1 | * | 4/2012 | Miller | H04W 4/006 340/506 |
| 8,344,880 | B2 | * | 1/2013 | Seiler | G05B 19/0423 340/539.1 |
| 8,441,266 | B1 | * | 5/2013 | Xiao | G11C 17/18 324/537 |
| 8,686,596 | B2 | * | 4/2014 | Huss | H01H 85/32 307/117 |
| 2006/0050464 | A1 | * | 3/2006 | Von Arx | H01R 9/2425 361/104 |
| 2006/0052905 | A1 | * | 3/2006 | Pfingsten | H01R 9/2425 700/286 |
| 2006/0163660 | A1 | * | 7/2006 | Jin | H01L 27/0259 257/361 |
| 2007/0142934 | A1 | | 6/2007 | Boercsoek et al. | |
| 2007/0184684 | A1 | * | 8/2007 | Bormann | G05B 23/0256 439/76.1 |
| 2007/0290788 | A1 | * | 12/2007 | Erkens | G05B 19/0426 340/3.1 |
| 2009/0212975 | A1 | * | 8/2009 | Ausman | G01R 31/3277 340/945 |
| 2009/0315725 | A1 | * | 12/2009 | Hollander | H04B 1/034 340/584 |
| 2010/0318229 | A1 | | 12/2010 | Kaszkin et al. | |
| 2011/0140902 | A1 | * | 6/2011 | Huss | H01H 85/32 340/638 |
| 2013/0278395 | A1 | | 10/2013 | Johnson et al. | |

FOREIGN PATENT DOCUMENTS

| | | |
|---|---|---|
| CN | 101995336 | 3/2011 |
| CN | 202794900 | 3/2013 |
| JP | 62-107301 | 5/1987 |
| JP | 5-204417 | 8/1993 |
| JP | 5-346809 | 12/1993 |
| JP | 2002-333901 | 11/2002 |
| JP | 2009-080741 | 4/2009 |
| RU | 2278357 | 6/2006 |

OTHER PUBLICATIONS

Rosemount, Rosemount 702 Wireless Discrete Transmitter, Dec. 13, 2012, http://www2.emersonprocess.com/siteadmincenter/PM Rosemount Documents/00813-0100-4702.pdf.
Transmittal of the International Search Report and the Written Opinion of the International Searching Authority, or the Declaration dated Sep. 13, 2013 for International Appln. No. PCT/US2013/029491, filed Mar. 7, 2013. 16 pgs.
Communication pursuant to Rules 161(1) and 162 EPC for European Patent Application No. 13713268.4-1802, dated Dec. 5, 2014, 2 pages.
Office Action from Chinese Patent Application Serial No. 201210282403.0, dated Jan. 29, 2015.
Office Action from Australian Patent Application Serial No. 2013249848, dated Mar. 17, 2015.
Office Action from Chinese Patent Application Serial No. 201210282403.0, dated Jul. 6, 2015.
Office Action from Australian Patent Application Serial No. 2013249848, dated Oct. 8, 2015.
Communication Under Rule 164(2)(a) EPC from European Patent Application Serial No. 13713268.4, dated Aug. 3, 2015.
Communication Pursuant to Rule 164(2)(b) and Article 94(3) from European Patent Application Serial No. 13713268.4, dated Sep. 22, 2015.
The Examiner's Report from Canadian Patent Application No. 2866157, dated Nov. 30, 2015.
The Office Action from Japanese Patent Application No. 2015-506989, dated Nov. 24, 2015.
Office Action from Russian Patent Application No. 2014146298, dated Jan. 13, 2016.

* cited by examiner

WIRELESS FIELD DEVICE HAVING DISCRETE INPUT/OUTPUT

BACKGROUND

The present invention relates to field devices of the type used to control or monitor industrial processes. More specifically, the present invention relates to an industrial process field device having a discrete input and a discrete output.

Industrial processes are employed in the monitoring or manufacturing of process materials and fluids such as oil, paper pulp, etc. In order to monitor operation of an industrial process, process variable transmitters are employed. The process variable transmitters measure process variables and transmit the process variable information to a centralized location. Example process variables include flow rate, temperature, pressure, fluid level, etc. The process variable transmitter is one example of a field device. Another example field device is a controller. The controller is used to control operation of the process by actuating a control element. For example, the controller can adjust the position of a valve, change the speed of a pump, change the temperature of a heating element, etc. The controller may receive its instructions from a centralized location.

Typically, the field devices rely on wired communication to a central location. Example wired communication techniques include two-wire process control loops in which both power and information are carried on the same two wires. However, more recently wireless communication techniques have been employed with field devices. One example wireless communication technique is set forth in the Wireless HART® communication protocol in accordance with the IEC 62591 Standard.

SUMMARY

A wireless field device for use in an industrial process includes input/output terminals configured to couple to a process interface element. A discrete input/output channel is configured to receive a discrete input from the process interface element through the input/output terminals when configured as a discrete input channel. The discrete input/output channel is further configured to provide a discrete output to the process interface element through the input/output terminals when the discrete input/output channel is configured as discrete output channel. Wireless communication circuitry is configured to transmit and receive information. A controller communicates information through the wireless communication circuitry and operates in accordance with configuration information to configure the input/output channel as an input channel when the input/output terminals are connected to a discrete process variable sensor, and further configure the discrete input/output channel as a discrete output channel when the input/output terminals are coupled to a discrete control element.

DETAILED DESCRIPTION OF ILLUSTRATIVE EMBODIMENTS

The present invention provides a field device capable of receiving a discrete input from a sensor in an industrial process related to a process variable. The sensor is coupled to terminals of the field device. Further, the terminals of the field device can be configured to provide a discrete output to a discrete control element in the process. This allows the same two terminals to be configured for use in sensing a process variable as well as for controlling a process variable, as desired. The field device is configured for wireless communication to a remote location. The wireless communication can be in accordance with any appropriate technique such as, for example, the Wireless HART® communication protocol in accordance with the IEC 62591 Standard.

Figure 1:
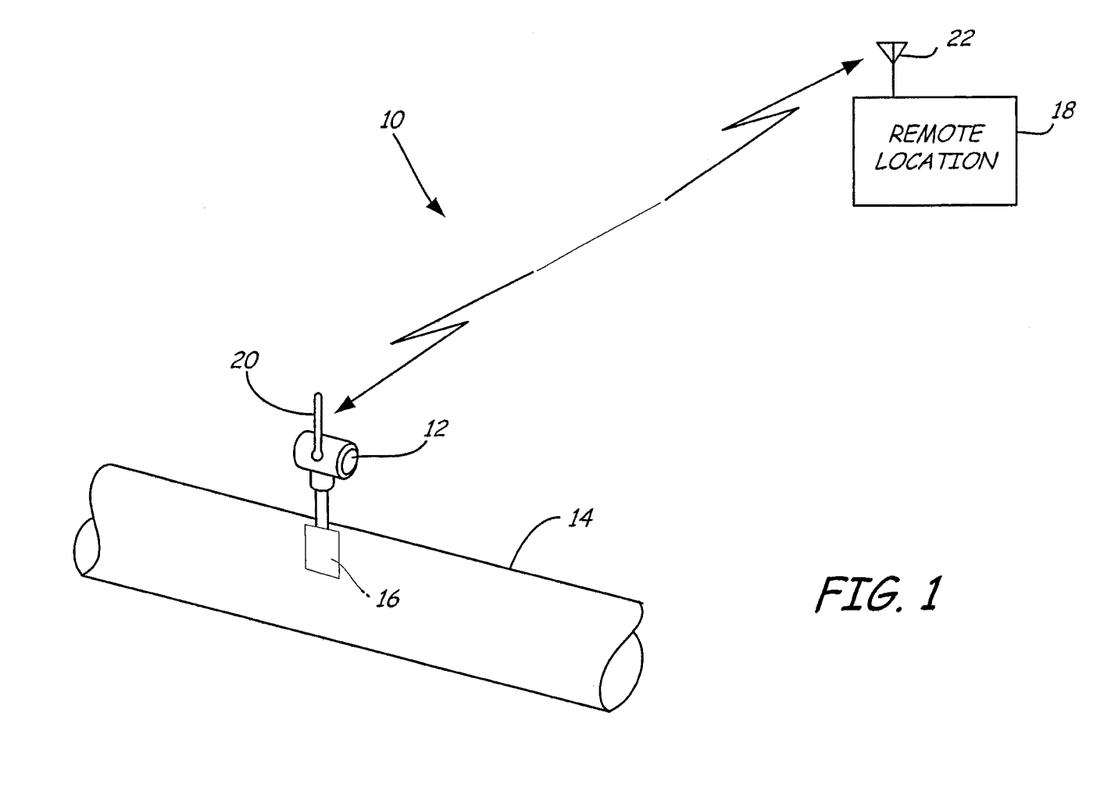
FIG. 1 is a simplified diagram of an industrial process including a field device.

FIG. 1 is a simplified block diagram of an industrial process 10 including a wireless field device 12 coupled to process piping 14. The process piping can carry a process fluid. The wireless field device includes a discrete process interface element 16 which may comprise a control element if the device is configured to provide a discrete control output signal, or can comprise process variable sensor if the field device 12 is configured to sense a process variable from a discrete process variable sensor. If configured to sense a process variable, the field device 12 can wirelessly communicate information related to the sensed process variable to a remote location 18 through antennas 20 and 22. The remote location 18 can comprise, for example, a central location such as a control room. As discussed below in more detail, the field device 12 can also be configured to provide a control output. In one example of such a configuration, information is received from the remote location 18 which is used to responsively provide the control output.

Examples of a discrete process variable sensor include a switch which changes state when a particular event happens, such as a temperature threshold is exceeded or a level threshold is exceeded. Another type of discrete process variable sensor provides a series of pulses which are related to a sensed process variable which can be counted. Examples of such process variable sensors include turbine flow meter and magnetic flow meter pulse outputs.

Figure 2A:
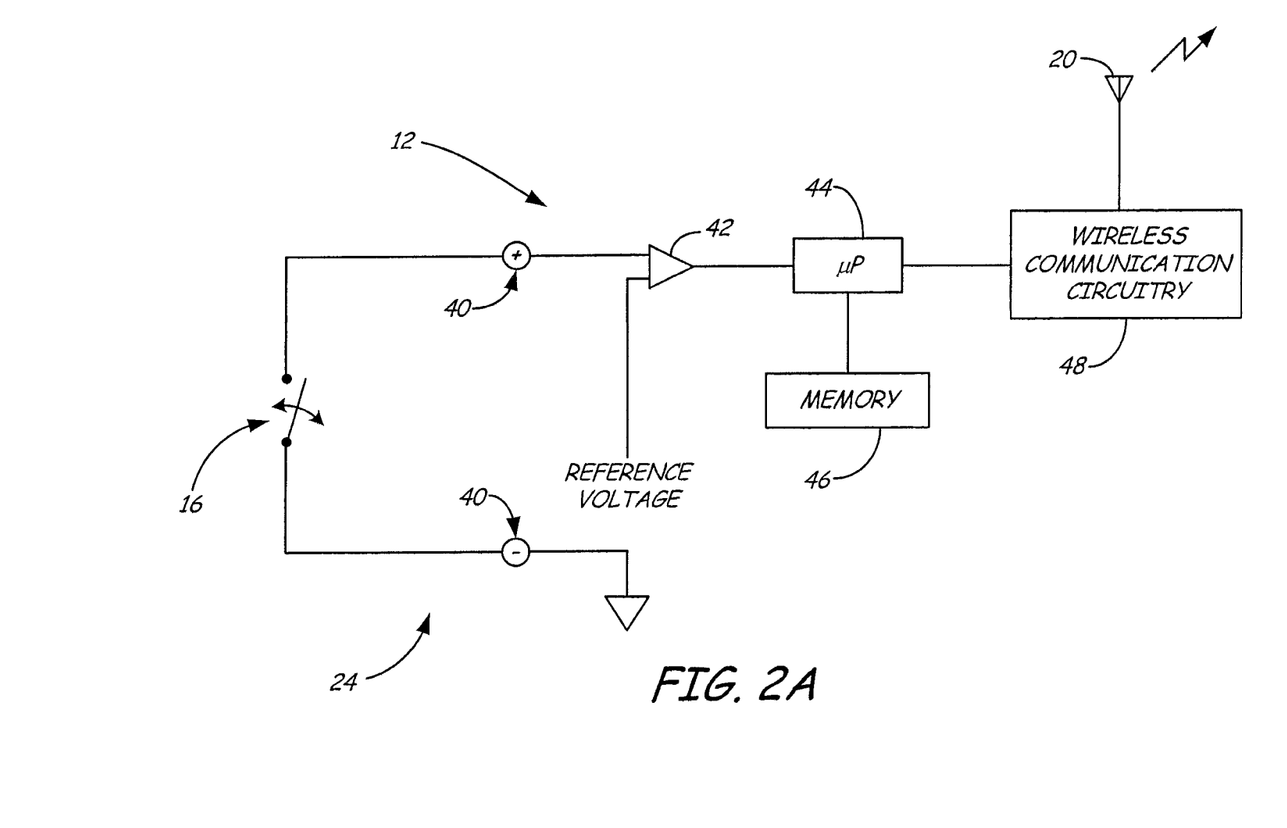
FIG. 2A is a simplified block diagram of a field device of FIG. 1 configured as providing a discrete input channel from a discrete sensor.

FIG. 2A is a simplified block diagram of field device 12 having a channel 24 configured to receive an input from a discrete process variable sensor. In FIG. 2, the process interface element 16 is illustrated as a two-position (opened and closed) switch. The switch connects to input/output terminals 40 of the field device 12. One of the terminals 40 connects to a comparator 42 which also receive a reference voltage. For example, if the switch is closed, a high output is provided to a microprocessor 44 whereas if the switch is open, a low output is provided. The microprocessor 44 receives the output from the comparator and operators in accordance with instructions stored in a memory 46. Based upon the received input, the microprocessor 44 can communicate wirelessly using wireless communication circuitry 48.

Figure 2B:
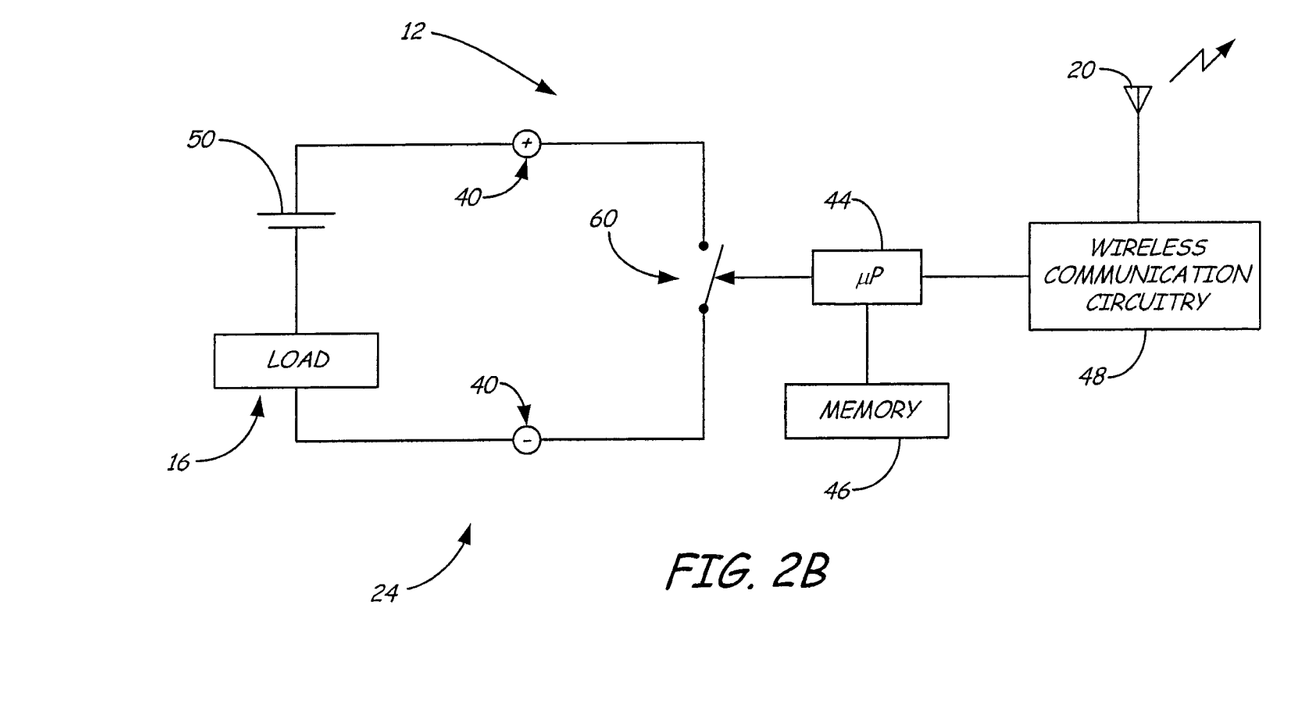
FIG. 2B is a simplified block diagram of a field device of FIG. 1 configured as providing a discrete output channel to a discrete control element.

FIG. 2B shows an alternative configuration of field device 12 in the channel 24 is coupled to a discrete control element.

In FIG. 2B, the process interface element 16 is illustrated as a load which is connected to a voltage source 50. For example, the load 16 may be a relay, a valve actuator, etc. In FIG. 2B, the load 16 and voltage source 50 are coupled to the input/output terminals 40 of the field device 12. Rather than using a comparator 42, in the configuration of FIG. 2B the field device 12 couples a switch 60 to the load 16 through terminals 40. The switch 60 operates under the control of microprocessor 44. FIG. 2A illustrates the device configured to provide an input channel whereas FIG. 2B illustrates the device configured to provide an output channel.

The configuration of field device 12 which is illustrated in FIG. 2B can be problematic in some environments. For example, because field device 12 is coupled to an external power source 50, large currents or voltages may be introduced into the circuitry of the field device 12 thereby damaging the circuitry. This may cause the circuitry to completely fail or may cause the circuitry to partially fail, for example, introducing errors in subsequent measurements or control signals. Further, the device 12 may experience radiation bursts, electrostatic discharges, or other events which could cause damage to circuitry. Additionally, the device 12 should be configured to operate in an "intrinsically safe" manner in which the device is not capable of causing damage to other components in the industrial process or its surroundings. Additionally, because the device 12 is configured to operate wirelessly, the circuitry of device 12 should operate using very little power.

Figure 3:
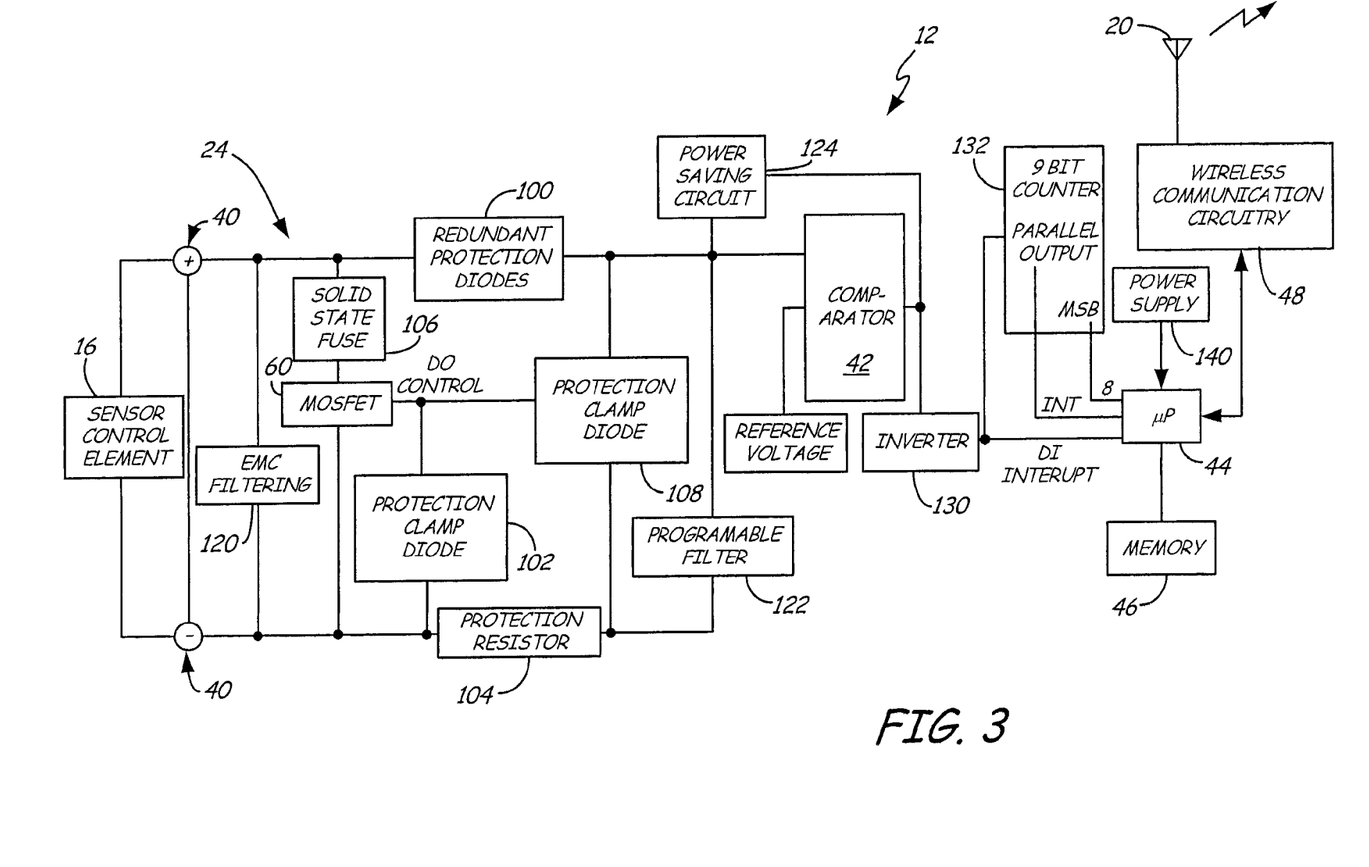
FIG. 3 is a simplified block diagram of a field device of FIG. 1 configured for discrete input and discrete output.

Pursuant to one embodiment, FIG. 3 is a more detailed block diagram of field device 12. In FIG. 3, the device 12 connects to the process interface element 16 through channel 24 which can be configured as a discrete input channel or a discrete output channel as discussed below in more detail. As noted above, when coupling to a process interface element 16 configured as a control element, energy present in the field wiring may be introduced into the circuitry of the field device 12. The present invention provides a number of features to prevent such energy from damaging the field device 12 circuitry. For example, redundant protection diodes 100 are provided which are connected in series with the terminals 40 to block any reverse current from entering device 12. Protection clamp diodes 102 and 108 are provided to clamp voltages at the input to no more than 6.2 volts. A resettable solid state fuse 106 is provided and connected in series with the switch 60 to limit the current to less than 500 mA. Note that in FIG. 3, the switch 60 is illustrated as a MOSFET. An isolation resistor 104 is provided to block current between the minus terminal 40 and the electronic circuit common. An independent watchdog circuit (discussed below) is included to safely control output switch in the case of a fault condition.

In addition to providing protection against energy entering the field device, the present invention further includes circuitry configured to prevent damage to circuitry of field device 12 due to electromagnetic radiation, static discharges, etc. This protection includes the use of EMC filtering circuitry 120. The power savings circuit reduces circuit current consumption when configured as in input and when the input is closed or shorted.

In FIG. 3, the switch 60 receives a DO control (Discrete Output control) signal from the microprocessor 44. FIG. 3 also illustrates the output of comparator 42 as being provided to an inverter 130 prior to coupling to a discrete input interrupt of microprocessor 44. In this configuration, the microprocessor 44 receives an interrupt when the output from inverter 130 goes to a signal high level. In another configuration, the output from inverter 130 is provided to a counter 132 which is configured to count pulses in the output. For example, the counter can count pulses and provide an interrupt to the microprocessor 44 when a most significant bit (MSB) is triggered, thereby indicating that the counter has reached a maximum. A power supply circuit 140 is also illustrated in FIG. 3. The power supply circuit 140 may include, for example, a battery or other power source to provide power to the circuitry of the field device 12.

Figure 4:
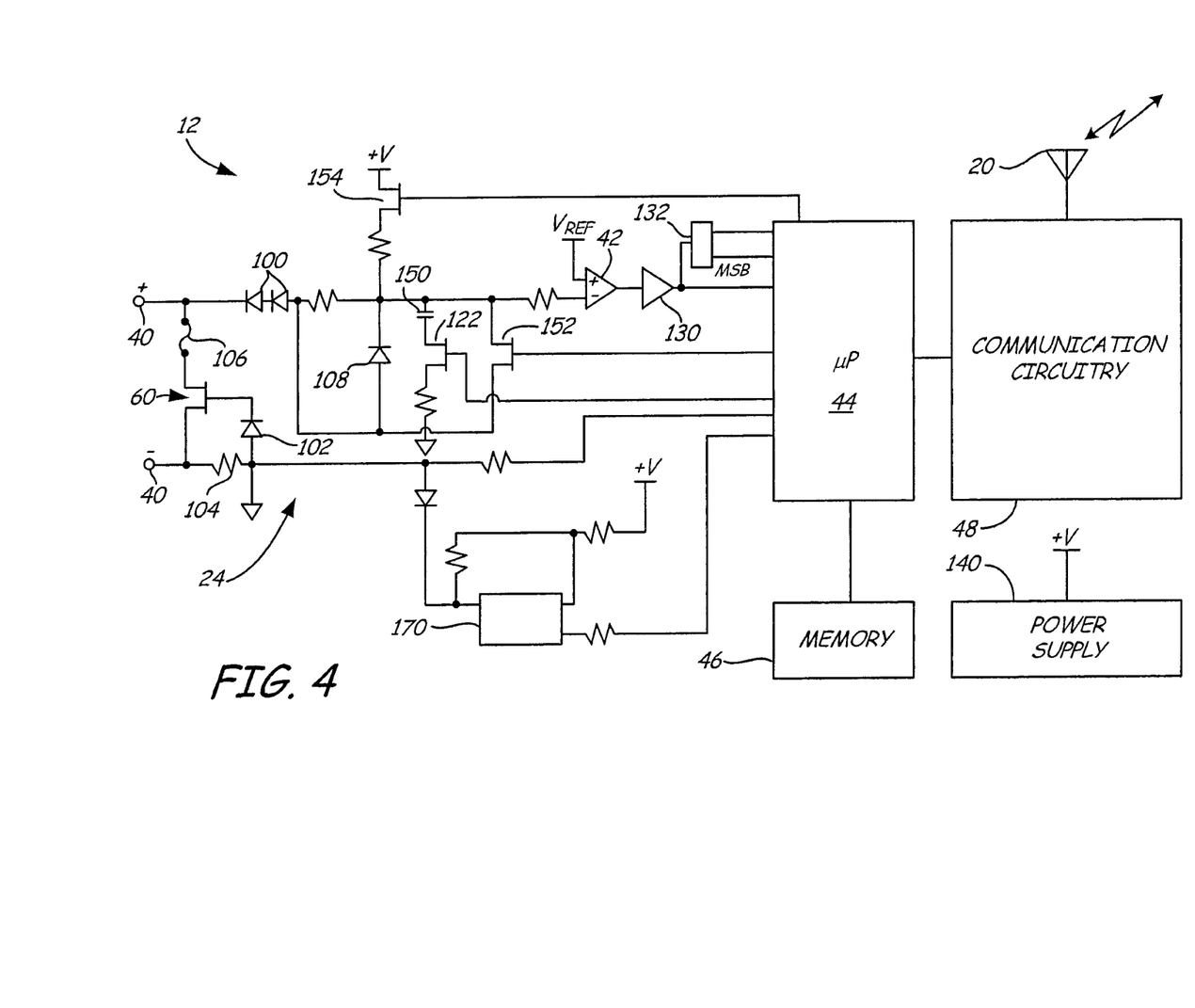
FIG. 4 is a simplified schematic diagram showing a channel of the field device of FIG. 1 which can be configured as a discrete input channel (FIG. 2A) or a discrete control output channel (FIG. 2B).

FIG. 4 is a simplified schematic diagram showing circuitry of field device 12 in greater detail. As discussed above, the terminals 40 of the field device 12 can be configured to operate as a discrete input from a process variable sensor or to provide a discrete control output to a control element. When receiving a discrete input, microprocessor 44 provides a low signal to the gate of field effect transistor 60 thereby switching transistor 60 "off". In this condition, when a process variable sensor switch is connected to terminals 40 and is in the "open" position, the output from comparator 42 will be in a logic low condition. This is inverted by inverter 130 and can be sensed, for example through an interrupt, by microprocessor 44. Similarly, when the switch is in a closed position, the negative input to the comparator will be at a logic low value thereby causing the output of comparator 42 to be at a high value. This is inverted by inverter 130 and can be sensed by microprocessor 44. If desired, hysteresis can be introduced into this process thereby reducing susceptibility to noise or other glitches and thereby providing "dead band" to the circuitry.

Counter 132 can be used for counting pulses. For example, an 8-bit counter along with a flip flop can be used to implement counter 132 to provide a 9-bit counter. This can allow the hardware counter 132 to operate relatively fast without providing constant microprocessor interrupts. More specifically, a most significant bit (MSB) output from the counter 132 can be sensed by microprocessor 44 as an interrupt thereby signaling that the maximum value of the counter 132 has been reached.

Programmable filter 122 is illustrated as a field effect transistor coupled to the microprocessor 44. Filtering can be enabled by turning the transistor 122 "on" thereby connecting a capacitor 150 in parallel with the terminals 40. For example, in one configuration, with the filter in the "on" condition, the maximum counting rate may be limited to approximately 50 Hz, whereas with the filter disabled, the maximum rate may be approximately 1 kHz. The current consumption of the circuitry is less than 20 µA when configured for receiving a discrete input.

In addition to being able to be configured as an input channel, the circuitry in FIG. 4 can also be configured as a discrete output channel. In this configuration, microprocessor 44 turns transistor 122 "off" thereby disabling the filtering. Further, transistor 152 is turned "on" by microprocessor 44 thereby shorting the sensor input line to ground. Further, transistor 154 is off thereby disabling the sense current. Microprocessor 44 may then responsively control the transistor 60. By turning transistor 60 on, the terminals 40 are shorted together. Similarly, in the off condition, the terminals 40 are disconnected from one another. Diode 108 is provided to limit the voltage which could be applied to the electronics in the event that the diodes 100 fails. Resistor 104 is used to provide isolation between the negative input terminal and circuit ground. The resistor 104 isolates high currents to the terminals of the control channel and away from the rest of the electronics. Current consumption when configured in this manner is on the order of 5 µA.

FIG. 4 also illustrates a watchdog circuit 170 that may preferably be employed as part of the fluid device. Watchdog circuit 170 includes a connection to the positive power supply voltage +V. Additionally, circuit 170 couples to microprocessor 44. During operation, if the power supply voltage drops below a threshold level, circuit 170 will pull the gate of transistor 60 low thereby ensuring that transistor 60 is turned off. Similarly, microprocessor 44 must periodically (for example every one second) provide a "kick" signal to watchdog circuit 170. Failure to receive this "kick" signal will also result in the watchdog circuit 170 turning off transistor 60.

In another embodiment, microprocessor 44 may periodically monitor the output of the field device 12 when configured to provide a discrete output. For example, microprocessor 44 may periodically briefly turn transistors 154 on and 152 off allowing the state of the output at the positive terminal 40 to be read back. This can be used to ensure that the output is in its desired condition.

During operation, microprocessor 44 operates in accordance with instructions stored in memory 46. These instructions cause the microprocessor 44 to configure the channel 24 illustrated in FIG. 4 as a discrete input channel or as a discrete output channel. The configuration information can be stored during commissioning or configuration of the device or can be received by the device using communication circuitry 48. When the channel 24 illustrated in FIG. 4 is configured as a discrete output channel, the microprocessor 44 will couple the terminals 40 together as described above. The instructions to perform this operation may be received, for example, using communication circuitry 48. In another example configuration, more than one channel such as that illustrated in FIG. 4 is coupled to the microprocessor 44. In such a configuration, the input from a discrete input channel can be used as the basis for providing a particular output on another channel configured as an output channel. When the channel 24 is configured as a discrete input channel, the microprocessor 44 can use communication circuitry 48 to transmit information related to a sensed process variable to a remote location.

Although the present invention has been described with reference to preferred embodiments, workers skilled in the art will recognize that changes may be made in form and detail without departing from the spirit and scope of the invention.

What is claimed is:

1. A wireless field device for use in an industrial process, comprising:
    input/output terminals configured to couple to a process interface element;
    a discrete input/output channel configured to receive a discrete input signal from the process interface element through the input/output terminals when configured as a discrete input channel, the discrete input/output channel further configured to provide a discrete output to the process interface element through the input/output terminals when configured as discrete output channel;
    wireless communication circuitry configured to transmit and receive information;
    a memory configured to store configuration information;
    a controller configured to:
        transmit information through the wireless communication circuitry based upon a process variable sensed using the process interface element;
        provide a discrete control output signal to the process interface element to control a process variable in response to information received by the wireless communication circuitry;
    the controller further configured to operate in accordance with the configuration information stored in the memory to configure the input/output channel as an input channel when the input/output terminals are connected to a discrete process variable sensor, and further configured to configure the discrete input/output channel as a discrete output channel when the input/output terminals are coupled to a discrete control element; and
    protection circuitry coupled to the discrete input/output channel configured to protect circuitry of the wireless field device from being damaged by energy received through the input/output terminals;
    wherein the discrete input signal comprises a series of pulses which are related to a sensed process variable which can be counted.

2. The apparatus of claim 1 wherein the discrete input/output channel includes a switch configured to be actuated by the controller, the switch configured to selectively electrically couple the discrete input/output terminals together.

3. The apparatus of claim 2 including a fuse connected in series with the switch.

4. The apparatus of claim 1 wherein the discrete input/output channel includes a comparator coupled to the input/output terminals, the comparator configured to provide a signal to the controller based upon whether a switch connected to the discrete input/output terminals is open or closed.

5. The apparatus of claim 4 including a counter coupled to the output of the comparator, the counter configured to count closures of the switch.

6. The apparatus of claim 1 including a filter connected to the input/output terminals and wherein the controller is configured to selectively activate the filter.

7. The apparatus of claim 1 including at least two diodes connected in series with the input/output terminals to provide protection to circuitry of the wireless field device.

8. The apparatus of claim 1 including a watchdog circuit configured to cause circuitry of the wireless field device to enter a safe state if a component of the wireless field device fails.

9. The apparatus of claim 8 wherein the watchdog circuit is configured to cause the switch of claim 2 to open if a power supply voltage of the wireless field device is less than a threshold.

10. The apparatus of claim 8 wherein the watchdog circuit is configured to cause the switch of claim 2 to open if the watchdog circuit does not receive periodic "kick" signals from the controller.

11. A method of coupling to a process interface element using a wireless field device in an industrial process, comprising:
    coupling the process interface element to input/output terminals of the wireless field device;
    storing configuration information in a memory;
    preventing energy received through the input/output terminals from damaging circuitry of the wireless field device using circuitry coupled to the input/output terminals;
    configuring a discrete input/output channel as a discrete input channel based upon the stored configuration information if the process interface element comprises a discrete process variable sensor configured to provide a discrete output signal;

configuring the input/output channel as a discrete output channel and providing a discrete control output signal to a process interface element based upon the stored configuration information if the process interface element comprises a discrete control element;

transmitting information related to a sensed process variable to a remote location using wireless communication circuitry if the input/output channel is configured as a discrete input channel; and providing the discrete control output signal to the process interface element based upon information through the wireless communication circuitry if the discrete input/output channel is configured as a discrete output channel;

wherein the discrete input signal comprises a series of pulses which are related to a sensed process variable which can be counted.

12. The method of claim 11 wherein the discrete input/output channel includes a switch configured to be actuated by the controller, and further configuring the switch to selectively electrically couple the discrete input/output terminals together.

13. The method of claim 12 including providing a fuse connected in series with the switch.

14. The method of claim 11 wherein the discrete input/output channel includes a comparator coupled to the input/output terminals, and further configuring the comparator to provide a signal to a controller based upon whether a switch connected to the discrete input/output terminals is open or closed.

15. The method of claim 14 including providing a counter coupled to the output of the comparator, the counter configured to count closures of the switch.

16. The method of claim 11 including providing a filter connected to the input/output terminals and wherein the controller is configured to selectively activate the filter.

17. The method of claim 11 including providing at least two diodes connected in series with the input/output terminals to provide protection to circuitry of the wireless field device.

18. The method of claim 11 including providing a watchdog circuit configured to cause circuitry of the wireless field device to enter a safe state if a component of the wireless field device fails.

19. The method of claim 18 wherein the watchdog circuit is configured to cause a switch to open if a power supply voltage of the wireless field device is less than a threshold.

20. The method of claim 18 wherein the watchdog circuit is configured to cause a switch to open if the watchdog circuit does not receive periodic "kick" signals from a controller.

21. The apparatus of claim 1 including protection circuitry configured to prevent energy from entering the wireless field device through the discrete input/output channel.

22. The method of claim 11 including protecting the wireless field device from energy entering the wireless field device through the input/output channel.

23. The method of claim 11 wherein the discrete output from the discrete process variable sensor comprises at least one of a low signal or a high signal.

24. The method of claim 11 wherein the discrete control output signal comprises a switched output.

25. The method of claim 23 wherein the at least one of a low signal or a high signal comprises a series of pulses.

26. The apparatus of claim 1 wherein the discrete output from the discrete process variable sensor comprises at least one of a low signal or a high signal.

27. The apparatus of claim 1 wherein the discrete control output signal comprises a switched output.

28. The apparatus of claim 27 wherein the at least one of a low signal or a high signal comprises a series of pulses.

* * * * *